(12) United States Patent
Tétreault et al.

(10) Patent No.: US 11,821,763 B2
(45) Date of Patent: Nov. 21, 2023

(54) SYSTEM, METHOD AND OBJECT FOR HIGH ACCURACY MAGNETIC POSITION SENSING

(71) Applicant: Kongsberg Inc., Shawinigan (CA)

(72) Inventors: Rémi Tétreault, Shawinigan (CA); Louis Beaumier, Trois-Riviéres (CA); Christian Hébert, Shawinigan (CA); Simon Riverin, Trois-Rivieres (CA)

(73) Assignee: Kongsberg Inc., Shawinigan (CA)

( * ) Notice: Subject to any disclaimer, the term of this patent is extended or adjusted under 35 U.S.C. 154(b) by 0 days.

(21) Appl. No.: 17/328,529

(22) Filed: May 24, 2021

(65) Prior Publication Data
US 2021/0278251 A1 Sep. 9, 2021

Related U.S. Application Data

(63) Continuation of application No. 16/301,021, filed as application No. PCT/IB2016/052876 on May 17, 2016, now abandoned.

(51) Int. Cl.
*G01D 5/245* (2006.01)
*F16D 23/12* (2006.01)

(52) U.S. Cl.
CPC ............. *G01D 5/245* (2013.01); *F16D 23/12* (2013.01); *G01D 5/2451* (2013.01); *F16D 2300/18* (2013.01)

(58) Field of Classification Search
CPC ...... G01D 5/245; G01D 5/2451; F16D 23/12; F16D 2300/18
See application file for complete search history.

(56) References Cited

U.S. PATENT DOCUMENTS 3,263,796 A 8/1966 Parke
4,656,750 A 4/1987 Pitt et al.
(Continued)

FOREIGN PATENT DOCUMENTS

CA 2073293 C 11/1996
CN 2903949 Y 5/2007
(Continued)

OTHER PUBLICATIONS

Banks, Kevin, "The Goertzel Algorithm", Aug. 28, 2002, https://www.embedded.com/design/configurable-systems/4024443/The-Goertzel-Algorithm#, 5 pages.
(Continued)

*Primary Examiner* — Lee E Rodak
(74) *Attorney, Agent, or Firm* — Howard & Howard Attorneys PLLC

(57) ABSTRACT

Systems and methods for determining position are provided. An object produces a magnetic field having a first vector component, a second vector component, and a third vector component that are orthogonal to one another. A sensor measures a magnitude of each of the first, second, and third vector components when the object is within a range of positions. A controller is connected to the sensor and determines a relative position of the object within an undetermined cycle of a plurality of cycles based on the magnitude of the first vector component and the magnitude of the second vector component. The controller determines a cycle of the plurality of cycles in which the object is located based on the magnitude of the third vector component. The controller determines an absolute position of the object based on the relative position of the object and the cycle in which the object is located.

20 Claims, 6 Drawing Sheets

(56) References Cited

U.S. PATENT DOCUMENTS

| | | |
|---|---|---|
| 4,760,745 A | 8/1988 | Garshelis |
| 4,882,936 A | 11/1989 | Garshelis |
| 4,896,544 A | 1/1990 | Garshelis |
| 4,989,460 A | 2/1991 | Mizuno et al. |
| 5,052,232 A | 10/1991 | Garshelis |
| 5,307,690 A | 5/1994 | Hanazawa |
| 5,321,985 A | 6/1994 | Kashiwagi et al. |
| 5,351,555 A | 10/1994 | Garshelis |
| 5,419,207 A | 5/1995 | Kobayashi et al. |
| 5,465,627 A | 11/1995 | Garshelis |
| 5,520,059 A | 5/1996 | Garshelis |
| 5,522,269 A | 6/1996 | Takeda et al. |
| 5,526,704 A | 6/1996 | Hoshina et al. |
| 5,562,004 A | 10/1996 | Kaise et al. |
| 5,589,645 A | 12/1996 | Kobayashi et al. |
| 5,591,925 A | 1/1997 | Garshelis |
| 5,706,572 A | 1/1998 | Garshelis |
| 5,708,216 A | 1/1998 | Garshelis |
| 5,887,335 A | 3/1999 | Garshells |
| 5,939,881 A | 8/1999 | Slater et al. |
| 6,047,605 A | 4/2000 | Garshelis |
| 6,145,387 A | 11/2000 | Garshelis |
| 6,222,363 B1 | 4/2001 | Cripe |
| 6,260,423 B1 | 7/2001 | Garshelis |
| 6,278,271 B1 | 8/2001 | Schott |
| 6,341,534 B1 | 1/2002 | Dombrowski |
| 6,490,934 B2 | 12/2002 | Garshelis |
| 6,499,559 B2 | 12/2002 | Mc Cann et al. |
| 6,522,130 B1 | 2/2003 | Lutz |
| 6,553,847 B2 | 4/2003 | Garshelis |
| 6,581,480 B1 | 6/2003 | May et al. |
| 6,768,301 B1 | 7/2004 | Hohe et al. |
| 6,807,871 B1 | 10/2004 | Paek |
| 6,810,754 B2 | 11/2004 | May |
| 7,117,752 B2 | 10/2006 | May |
| 7,124,649 B2 | 10/2006 | May |
| 7,235,968 B2 | 6/2007 | Popovic et al. |
| 7,263,904 B2 | 9/2007 | Yoshida et al. |
| 7,302,867 B2 | 12/2007 | May |
| 7,305,882 B1 | 12/2007 | May |
| 7,308,835 B2 | 12/2007 | Cripe |
| 7,362,096 B2 | 4/2008 | Oberdier et al. |
| 7,363,827 B2 | 4/2008 | Hedayat et al. |
| 7,389,702 B2 | 6/2008 | Ouyang et al. |
| 7,391,211 B2 | 6/2008 | Cripe |
| 7,409,878 B2 | 8/2008 | Von Beck et al. |
| 7,469,604 B2 | 12/2008 | Hedayat et al. |
| 7,506,554 B2 | 3/2009 | Shimizu et al. |
| 7,845,243 B2 | 12/2010 | Poirier et al. |
| 7,895,906 B2 | 3/2011 | Hedayat et al. |
| 7,932,684 B2 | 4/2011 | O'Day et al. |
| 7,969,148 B2 | 6/2011 | Noguchi et al. |
| 8,001,849 B2 | 8/2011 | Weng |
| 8,001,850 B2 | 8/2011 | Hedayat et al. |
| 8,058,865 B2 | 11/2011 | May |
| 8,087,304 B2 | 1/2012 | Lee |
| 8,181,538 B2 | 5/2012 | Yamamura et al. |
| 8,191,431 B2 | 6/2012 | Hedayat et al. |
| 8,203,334 B2 | 6/2012 | Baller et al. |
| 8,316,724 B2 | 11/2012 | Ling et al. |
| 8,373,410 B2 | 2/2013 | Frachon |
| 8,424,393 B1 | 4/2013 | Lee |
| 8,468,898 B2 | 6/2013 | Baller et al. |
| 8,578,794 B2 | 11/2013 | Lee |
| 8,635,917 B2 | 1/2014 | Lee |
| 8,677,835 B2 | 3/2014 | Goto et al. |
| 8,701,503 B2 | 4/2014 | Shimizu et al. |
| 8,707,824 B2 | 4/2014 | Benkert et al. |
| 8,836,458 B2 | 9/2014 | Lee |
| 8,844,379 B2 | 9/2014 | Pietron et al. |
| 8,890,514 B2 | 11/2014 | Masson et al. |
| 8,893,562 B2 | 11/2014 | Barraco et al. |
| 9,024,622 B2 | 5/2015 | Hohe et al. |
| 9,151,686 B2 | 10/2015 | Barraco et al. |
| 9,254,863 B2 | 2/2016 | Kuwahara et al. |
| 9,284,998 B2 | 3/2016 | Giessibl |
| 9,347,845 B2 | 5/2016 | Giessibl |
| 9,494,661 B2 | 11/2016 | Paul et al. |
| 9,575,141 B2 | 2/2017 | Rohrer |
| 9,593,990 B2 | 3/2017 | Duan et al. |
| 9,618,318 B2 | 4/2017 | Schaaf |
| 9,683,906 B2 | 6/2017 | Giessibl |
| 10,151,652 B2 | 12/2018 | Giessibl |
| 10,983,019 B2 | 4/2021 | Panine |
| 2001/0029791 A1 | 10/2001 | Sezaki |
| 2004/0119470 A1 | 6/2004 | Yajima et al. |
| 2005/0204830 A1 | 9/2005 | Kuroda et al. |
| 2005/0204831 A1 | 9/2005 | Mori et al. |
| 2007/0028709 A1* | 2/2007 | Futamura ............... G01D 5/145 74/335 |
| 2007/0034021 A1 | 2/2007 | Cripe |
| 2007/0096724 A1 | 5/2007 | Oberdier et al. |
| 2008/0048179 A1 | 2/2008 | Shin et al. |
| 2008/0221399 A1 | 9/2008 | Zhou et al. |
| 2009/0072818 A1 | 3/2009 | Mizuno et al. |
| 2010/0097059 A1 | 4/2010 | Estrada et al. |
| 2010/0156394 A1 | 6/2010 | Ausserlechner et al. |
| 2010/0328799 A1 | 12/2010 | Braganca et al. |
| 2011/0106557 A1 | 5/2011 | Gazula |
| 2011/0162464 A1 | 7/2011 | Weng |
| 2012/0007597 A1 | 1/2012 | Seeger et al. |
| 2012/0007598 A1 | 1/2012 | Lo et al. |
| 2012/0296577 A1 | 11/2012 | Garshelis et al. |
| 2013/0125669 A1 | 5/2013 | Barraco et al. |
| 2013/0181702 A1 | 7/2013 | May |
| 2013/0218517 A1 | 8/2013 | Ausserlechner |
| 2013/0285651 A1 | 10/2013 | Wan et al. |
| 2014/0195117 A1 | 7/2014 | Kuwahara et al. |
| 2014/0197820 A1* | 7/2014 | Ritter .................. G01B 7/14 324/207.13 |
| 2014/0197822 A1 | 7/2014 | Ritter et al. |
| 2014/0354270 A1 | 12/2014 | Kawano et al. |
| 2015/0025761 A1 | 1/2015 | Kernebeck |
| 2015/0057885 A1 | 2/2015 | Brady et al. |
| 2015/0230294 A1 | 8/2015 | Tonomura et al. |
| 2015/0253162 A1 | 9/2015 | Kusumi et al. |
| 2015/0274204 A1 | 10/2015 | Shiraishi et al. |
| 2016/0121924 A1 | 5/2016 | Norstad |
| 2016/0238472 A1 | 8/2016 | Giessibl |
| 2017/0324930 A1 | 11/2017 | Shaya |
| 2017/0356822 A1 | 12/2017 | Giessibl |
| 2017/0370788 A1 | 12/2017 | Neuschaefer-Rube et al. |
| 2018/0231425 A1 | 8/2018 | Raths Ponce et al. |
| 2019/0178683 A1 | 6/2019 | Tetreault et al. |
| 2020/0088594 A1 | 3/2020 | Simard |

FOREIGN PATENT DOCUMENTS

| | | |
|---|---|---|
| CN | 101283236 A | 10/2008 |
| CN | 102472638 A | 5/2012 |
| CN | 102519633 A | 6/2012 |
| CN | 104204730 A | 12/2014 |
| CN | 104246440 A | 12/2014 |
| CN | 105277303 A | 1/2016 |
| DE | 3206503 C1 | 8/1983 |
| DE | 102010033308 A1 | 2/2012 |
| DE | 102015202240 B3 | 2/2016 |
| EP | 0067974 A2 | 12/1982 |
| EP | 0217640 A2 | 4/1987 |
| EP | 0362890 A2 | 4/1990 |
| EP | 0609463 A1 | 8/1994 |
| EP | 0697602 A2 | 2/1996 |
| EP | 0947846 A2 | 10/1999 |
| EP | 979988 A1 * | 2/2000 ............. G01D 5/145 |
| EP | 1206707 A1 | 5/2002 |
| EP | 1211494 A1 | 6/2002 |
| EP | 1243905 A1 | 9/2002 |
| EP | 1319934 A2 | 6/2003 |
| EP | 1400795 A1 | 3/2004 |
| EP | 1518131 A1 | 3/2005 |
| EP | 1668378 A1 | 6/2006 |
| EP | 1795864 A1 | 6/2007 |
| EP | 1949057 A2 | 7/2008 |
| EP | 1950545 A2 | 7/2008 |

(56) References Cited

FOREIGN PATENT DOCUMENTS

| | | |
|---|---|---|
| EP | 2049901 A2 | 4/2009 |
| EP | 2049910 A2 | 4/2009 |
| EP | 2260278 A2 | 12/2010 |
| EP | 2065691 B1 | 12/2011 |
| EP | 2447690 A2 | 5/2012 |
| EP | 2527857 A2 | 11/2012 |
| EP | 1386127 B1 | 1/2013 |
| EP | 2766740 A1 | 8/2014 |
| EP | 2793009 A1 | 10/2014 |
| EP | 2799327 A1 | 11/2014 |
| EP | 2799827 A1 | 11/2014 |
| EP | 2806283 A2 | 11/2014 |
| EP | 3256828 B1 | 7/2019 |
| JP | S6141935 A | 2/1986 |
| JP | H0116349 B2 | 3/1989 |
| JP | H01187425 A | 7/1989 |
| JP | H02280023 A | 11/1990 |
| JP | H02280024 A | 11/1990 |
| JP | H041542 A | 1/1992 |
| JP | H04191630 A | 7/1992 |
| JP | H0545240 A | 2/1993 |
| JP | H05066164 A | 3/1993 |
| JP | H05126654 A | 5/1993 |
| JP | H0540849 U | 6/1993 |
| JP | H0543040 U | 6/1993 |
| JP | H0545537 U | 6/1993 |
| JP | H05045538 U | 6/1993 |
| JP | H05231966 A | 9/1993 |
| JP | H05231967 A | 9/1993 |
| JP | H05346360 A | 12/1993 |
| JP | H06014939 U | 2/1994 |
| JP | H0674844 A | 3/1994 |
| JP | H0628673 U | 4/1994 |
| JP | H06047832 U | 6/1994 |
| JP | H06258158 A | 9/1994 |
| JP | H06300647 A | 10/1994 |
| JP | H06323930 A | 11/1994 |
| JP | H072943 U | 1/1995 |
| JP | H0780756 A | 3/1995 |
| JP | H07159258 A | 6/1995 |
| JP | H0743521 U | 8/1995 |
| JP | H085477 A | 1/1996 |
| JP | H08043216 A | 2/1996 |
| JP | H08293634 A | 11/1996 |
| JP | H0985587 A | 3/1997 |
| JP | H0995247 A | 4/1997 |
| JP | H09189624 A | 7/1997 |
| JP | 2001050830 A | 2/2001 |
| JP | 2002333375 A | 11/2002 |
| JP | 2002340701 A | 11/2002 |
| JP | 2003307460 A | 10/2003 |
| JP | 2004053433 A | 2/2004 |
| JP | 2004053434 A | 2/2004 |
| JP | 2004053435 A | 2/2004 |
| JP | 2004225096 A | 8/2004 |
| JP | 2004264188 A | 9/2004 |
| JP | 2005321272 A | 11/2005 |
| JP | 2006010669 A | 1/2006 |
| JP | 2006126130 A | 5/2006 |
| JP | 2007101427 A | 4/2007 |
| JP | 2007181327 A | 7/2007 |
| JP | 2008026160 A | 2/2008 |
| JP | 2009122042 A | 6/2009 |
| JP | 2013053954 A | 3/2013 |
| JP | 2013053957 A | 3/2013 |
| JP | 2015009602 A | 1/2015 |
| JP | 2015010870 A | 1/2015 |
| KR | 20050075880 A | 7/2005 |
| KR | 20050093025 A | 9/2005 |
| KR | 20060054775 A | 5/2006 |
| KR | 20070004377 A | 1/2007 |
| WO | 9533982 A1 | 12/1995 |
| WO | 200118556 A1 | 3/2001 |
| WO | 200192906 A2 | 12/2001 |
| WO | 2003006922 A1 | 1/2003 |
| WO | 03071232 A1 | 8/2003 |
| WO | 200405873 A1 | 1/2004 |
| WO | 2004003585 A1 | 1/2004 |
| WO | 2005029106 A1 | 3/2005 |
| WO | 200554803 A1 | 6/2005 |
| WO | 2007092402 A2 | 8/2007 |
| WO | 2008017348 A2 | 2/2008 |
| WO | 2011119317 A1 | 9/2011 |
| WO | 2012016664 A2 | 2/2012 |
| WO | 2013053534 A1 | 4/2013 |
| WO | 2016127988 A1 | 8/2016 |
| WO | 2017199063 A1 | 11/2017 |
| WO | 2017214361 A1 | 12/2017 |
| WO | 2018109674 A1 | 6/2018 |

OTHER PUBLICATIONS

Computer-Assisted English language abstract for EP2806283A2 extracted from espacenet.com database on Jan. 7, 2019, 4 pages.
Computer-generated English language translation for JPH0540849U extracted from espacenet.com database on Aug. 1, 2019, 7 pages.
Computer-generated English language translation for JPH0543040U extracted from espacenet.com database on Aug. 1, 2019, 6 pages.
Computer-generated English language translation for JPH0545537U extracted from espacenet.com database on Aug. 1, 2019, 9 pages.
Computer-generated English language translation for JPH0545538U extracted from espacenet.com database on Aug. 1, 2019, 8 pages.
Computer-generated English language translation for JPH0614939U extracted from espacenet.com database on Aug. 1, 2019, 10 pages.
Computer-generated English language translation for JPH0628673U extracted from espacenet.com database on Aug. 1, 2019, 6 pages.
Computer-generated English language translation for JPH0647832U extracted from espacenet.com database on Aug. 1, 2019, 9 pages.
Computer-generated English language translation for JPH072943U extracted from espacenet.com database on Aug. 1, 2019, 8 pages.
Computer-generated English language translation for JPH0743521U extracted from espacenet.com database on Aug. 1, 2019, 8 pages.
Computer-generated English language translation for KR20050075880A extracted from espacenet.com database on Aug. 1, 2019, 4 pages.
Computer-generated English language translation for KR20050093025A extracted from espacenet.com database on Aug. 1, 2019, 4 pages.
Computer-generated English language translation for KR20060054775A extracted from espacenet.com database on Aug. 1, 2019, 4 pages.
English language abstract for CN 102519633 A extracted from espacenet.com database on Apr. 25, 2021, 1 page.
English language abstract for CN 1105277303 A extracted from espacenet.com database on Apr. 25, 2021, 1 page.
English language abstract for CN2903949Y extracted from espacenet.com database on Aug. 1, 2019, 1 page.
English language abstract for DE 10 2010 033 308 A1 extracted from espacenet.com database on Apr. 25, 2021, 2 pages.
English language abstract for DE3206503C1 extracted from espacenet.com database on Aug. 1, 2019, 1 page.
English language abstract for EP1243905A1 extracted from espacenet.com database on Jul. 17, 2019, 1 page.
English language abstract for EP 3 256 828 B1 extracted from espacenet.com database on Apr. 25, 2021, 1 page (see also English language equivalent U.S. 2017/0370788 A1 previously cited in SB08/IDS on Aug. 3, 2020).
English language abstract for EP0947846A2 extracted from espacenet.com database on Jan. 7, 2019, 1 page.
English language abstract for EP1243905A1 extracted from espacenet.com database on Aug. 1, 2019, 1 page.
English language abstract for EP1319934A2 extracted from espacenet.com database on Aug. 1, 2019, 2 pages.
English language abstract for JP2001050830A extracted from espacenet.com database on Aug. 1, 2019, 1 page.
English language abstract for JP2002333375A extracted from espacenet.com database on Aug. 1, 2019, 1 page.
English language abstract for JP2002340701A extracted from espacenet.com database on Aug. 1, 2019, 1 page.
English language abstract for JP2003307460A extracted from espacenet.com database on Aug. 1, 2019, 1 page.

(56) References Cited

OTHER PUBLICATIONS

English language abstract for JP2004053433A extracted from espacenet.com database on Aug. 1, 2019, 1 page.
English language abstract for JP2004053434A extracted from espacenet.com database on Aug. 1, 2019, 1 page.
English language abstract for JP2004053435A extracted from espacenet.com database on Aug. 1, 2019, 1 page.
English language abstract for JP2004225096A extracted from espacenet.com database on Aug. 1, 2019, 1 page.
English language abstract for JP2004264188A extracted from espacenet.com database on Aug. 1, 2019, 1 page.
English language abstract for JP2005321272A extracted from espacenet.com database on Aug. 1, 2019, 1 page.
English language abstract for JP2006010669A extracted from espacenet.com database on Aug. 1, 2019, 1 page.
English language abstract for JP2006126130A extracted from espacenet.com database on Aug. 1, 2019, 1 page.
English language abstract for JP2007101427A extracted from espacenet.com database on Aug. 1, 2019, 1 page.
English language abstract for JP2007181327A extracted from espacenet.com database on Aug. 1, 2019, 1 page.
English language abstract for JP2008026160A extracted from espacenet.com database on Aug. 1, 2019, 1 page.
English language abstract for JP2009122042A extracted from espacenet.com database on Aug. 1, 2019, 1 page.
English language abstract for JP2013053954A extracted from espacenet.com database on Aug. 1, 2019, 1 page.
English language abstract for JP2013053957A extracted from espacenet.com database on Aug. 1, 2019, 1 page.
English language abstract for JP2015009602A extracted from espacenet.com database on Aug. 1, 2019, 1 page.
English language abstract for JP2015010870A extracted from espacenet.com database on Aug. 1, 2019, 1 page.
English language abstract for JPH 08-293634 A extracted from espacenet.com database on Apr. 25, 2021, 2 pages.
English language abstract for JPH0116349B2 extracted from espacenet.com database on Aug. 1, 2019, 1 page.
English language abstract for JPH01187425A extracted from espacenet.com database on Aug. 1, 2019, 1 page.
English language abstract for JPH02280023A extracted from espacenet.com database on Aug. 1, 2019, 1 page.
English language abstract for JPH02280024A extracted from espacenet.com database on Aug. 1, 2019, 1 page.
English language abstract for JPH041542A extracted from espacenet.com database on Aug. 1, 2019, 1 page.
Chinese Search Report for CN 201680085804.3, dated Jan. 6, 2020, 1 page.
Chinese Search Report for CN 201780076546.7 dated Jun. 26, 2020, 2 pages.
Chinese Search Report for CN 201780076546.7 dated Mar. 1, 2021, 2 pages.
English language abstract for CN 101283236 A extracted from espacenet.com database on Jun. 2, 2021, 1 page.
English language abstract for CN 102472638 A extracted from espacenet.com database on Jun. 2, 2021, 2 pages.
English language abstract for CN 104204730 A extracted from espacenet.com database on Jun. 2, 2021, 1 page.
English language abstract for CN 104246440 A extracted from espacenet.com database on Jun. 2, 2021, 1 page.
English language abstract for JPH04191630A extracted from espacenet.com database on Aug. 1, 2019, 1 page.
English language abstract for JPH05126654A extracted from espacenet.com database on Aug. 1, 2019, 1 page.
English language abstract for JPH05231966A extracted from espacenet.com database on Aug. 1, 2019, 1 page.
English language abstract for JPH05231967A extracted from espacenet.com database on Aug. 1, 2019, 1 page.
English language abstract for JPH05346360A extracted from espacenet.com database on Aug. 1, 2019, 1 page.
English language abstract for JPH0545240A extracted from espacenet.com database on Aug. 1, 2019, 1 page.
English language abstract for JPH0566164A extracted from espacenet.com database on Aug. 1, 2019, 1 page.
English language abstract for JPH06258158A extracted from espacenet.com database on Aug. 1, 2019, 1 page.
English language abstract for JPH06300647A extracted from espacenet.com database on Aug. 1, 2019, 1 page.
English language abstract for JPH06323930A extracted from espacenet.com database on Aug. 1, 2019, 1 page.
English language abstract for JPH0674844A extracted from espacenet.com database on Aug. 1, 2019, 1 page.
English language abstract for JPH07159258A extracted from espacenet.com database on Aug. 1, 2019, 1 page.
English language abstract for JPH0780756A extracted from espacenet.com database on Aug. 1, 2019, 1 page.
English language abstract for JPH0843216A extracted from espacenet.com database on Aug. 1, 2019, 1 page.
English language abstract for JPH085477A extracted from espacenet.com database on Aug. 1, 2019, 1 page.
English language abstract for JPH09189624A extracted from espacenet.com database on Aug. 1, 2019, 1 page.
English language abstract for JPH0985587A extracted from espacenet.com database on Aug. 1, 2019, 1 page.
English language abstract for JPH0995247A extracted from espacenet.com database on Aug. 1, 2019, 1 page.
English language abstract for JPS6141935A extracted from espacenet.com database on Aug. 1, 2019, 1 page.
English language abstract for KR20070004377A extracted from espacenet.com database on Aug. 1, 2019, 1 page.
English language abstract for WO 2012/016664 A2 A extracted from espacenet.com database on Apr. 25, 2021, 1 page.
English language abstract for WO0118556A1 extracted from espacenet.com database on Jan. 7, 2019, 2 pages.
English language abstract for WO2004005873A1 extracted from espacenet.com database on Aug. 1, 2019, 2 pages.
English language abstract for WO2005029106A1 extracted from espacenet.com database on Jan. 7, 2019, 2 pages.
English language abstract for WO2005054803A1 extracted from espacenet.com database on Aug. 1, 2019, 2 pages.
English language abstract for WO2008017348A2 extracted from espacenet.com database on Jan. 7, 2019, 2 pages.
English language abstract for WO2013053534A1 extracted from espacenet.com database on Jan. 7, 2019, 1 page.
European Search Report for Application EP 17 88 0586 dated. Jun. 23, 2020, 2 pages.
International Search Report for Application No. PCT/IB2016/052876 dated Jan. 19, 2017, 4 pages.
International Search Report for Application No. PCT/IB2017/057858 dated Mar. 29, 2018, 5 pages.
International Search Report for Application No. PCT/IB2020/051099 dated Nov. 18, 2020, 4 pages.
Machine-assisted English language abstract for DE 10 2015 202 240 B3 extracted from espacenet.com database on Jul. 29, 2020, 2 pages.
Melexis, "MLX90316—Rotary Position Sensor IC Data Sheet", 3901090316, Rev. 10, Jul. 2013, 45 pages.
Melexis, "MLX90333—Position Sensor Data Sheet", Revision 008, Sep. 26, 2017, 48 pages.
Melexis, "MLX90363—Triaxis Magnetometer IC With High Speed Serial Interface Data Sheet", 3901090363, Rev. 005, Jul. 2013, 57 pages.
Microelectronic Integrated Systems (Melixis), "MLX90316 Rotary Position Sensor IC Manual", Revision 10, Jul. 2013, pp. 1-45.
Microelectronic Integrated Systems (Melixis), "MLX90363 Triaxis Magnetometer IC With High Speed Serial Interface Data Sheet", Revision 005, Jul. 2013, pp. 1-57.
Moving Magnet Technologies SA (MMT), "Magnetic Field Angle Position Sensors and Rotary Sensors", http://www.movingmagnet.com/en/analog-magnetic-field-angle-measurement/, 2016, 1 page.
Poincare, Jules Henri, "Exploring Magnetism—Session 1: Magnetism", http://cse.ssl.berkeley.edu/SegwayEd/lessons/exploring_magnetism/Exploring_Magnetism/s1.html, 2016, 6 pages.

(56) References Cited

OTHER PUBLICATIONS

Regents of the University of California Berkeley, "Exploring Magnetism—Session 1", http://cse.ssl.berkeley.edu/SegwayEd/lessons/exploring_magnetism/Exploring_Magnetism/s1.html, 2005, 6 pages.
Supplementary European Search Report for Application EP 16 90 2283.7 dated Nov. 18, 2019, 2 pages.
Supplementary European Search Report for Application EP 17 88 0586 dated Jun. 23, 2020, 2 pages.
U.S. Appl. No. 16/244,744, filed Jan. 10, 2019.
U.S. Appl. No. 16/468,584, filed Jun. 11, 2019.
U.S. Appl. No. 62/433,073, filed Dec. 1, 2016.

* cited by examiner

SYSTEM, METHOD AND OBJECT FOR HIGH ACCURACY MAGNETIC POSITION SENSING

CROSS REFERENCE TO RELATED APPLICATIONS

The subject application is a continuation of U.S. application Ser. No. 16/301,021, filed on Nov. 13, 2018, which is a National Stage of International Patent Application No. PCT/IB2016/052876, filed on May 17, 2016, both of which are expressly incorporated herein by reference in their entirety.

BACKGROUND

1. Field of the Invention

The subject invention relates to a system and method for high accuracy magnetic position sensing of an object, and more specifically, wherein magnetic position sensing is accomplished by measuring three vector components of a magnetic field produced by the object.

2. Description of Related Art

Magnetic position sensing technology is becoming an increasingly popular form of detection in various systems. However, conventional methods of magnetic position sensing determine position using only two vector components of a magnetic field of an object being sensed. For example, in automotive applications, such as clutch position measurement systems and transmission gear position sensing systems, conventional methods of sensing position using only two vector components of a magnetic field are inadequate for providing high-accuracy and high-precision measurements required for modern time-sensitive and position-sensitive automotive control systems. Another exemplary application is brushless DC motor control systems, where measurement of magnetic elements of rotors of brushless DC motors is required for tuning and efficient operation of the motors. Conventional methods of magnetic position sensing measure only two vector components of a magnetic field of an object being sensed and base determination of location of the object thereon. Therefore, conventional methods are not accurate and precise enough to allow for reliable operation of innovative position-sensitive control systems that are reliant on high-accuracy position determination.

SUMMARY

One embodiment of a system for determining position is provided. The system includes an object. The object is configured to produce a magnetic field having a first vector component, a second vector component, and a third vector component. The first, second, and third vector components are orthogonal to one another. A sensor is configured to measure a magnitude of each of the first, second, and third vector components when the object is within a range of positions. A controller is connected to the sensor. The controller is configured to determine a relative position of the object within an undetermined cycle of a plurality of cycles based on the magnitude of the first vector component and the magnitude of the second vector component. The controller is configured to determine a cycle of the plurality of cycles in which the object is located based on the magnitude of the third vector component. The controller is configured to determine an absolute position of the object based on the relative position of the object and the cycle in which the object is located.

One method of operating a system for determining position is provided. The system includes an object, a sensor, and a controller connected to the sensor. The object is configured to move within a range of positions. The object is further configured to provide a magnetic field having a first vector component, a second vector component, and a third vector component. The first, second, and third vector components are orthogonal to one another. The object is moved within the range of positions. The sensor measures a magnitude of each of the first, second, and third vector components when the object is within the range of positions. The controller determines a relative position of the object within an undetermined cycle of a plurality of cycles based on the magnitude of the first vector component and the magnitude of the second vector component. The controller determines a cycle of the plurality of cycles in which the object is located based on the magnitude of the third vector component. The controller determines an absolute position of the object based on the relative position of the object and the cycle in which the object is located.

One embodiment of an object for use in position sensing is also provided. The object has a length. The object is configured to move linearly within a range of positions. The object is configured to produce a magnetic field having a first vector component, a second vector component, and a third vector component. The first, second, and third vector components are orthogonal to one another. A magnitude of the first vector component and a magnitude of the second vector component each vary cyclically along the length of the object. The magnitude of the third vector component is unique for every position of the sensor along the length of the object.

The system, method, and object advantageously provide high accuracy determination of position of the object through three-dimensional magnetic sensing. By determining position of the object based on magnitudes of three dimensions of the magnetic field produced by the object, position of the object can be determined with extremely high accuracy and precision. This allows the system and method to be implemented within innovative position-sensitive control systems that are reliant on high-accuracy position sensing, such as transmission control modules of automated manual transmissions for automobiles, which are reliant on high-accuracy position determinations for clutches, as well as high-efficiency and high-precision brushless DC motor control systems, which are reliant on high-accuracy position determinations for magnetic rotors.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION

Referring to the Figures, wherein like numerals indicate like or corresponding parts throughout the several views, aspects of a system 10 and a method 30 for sensing position of an object 12 are provided.

I. System Description

Figure 1:
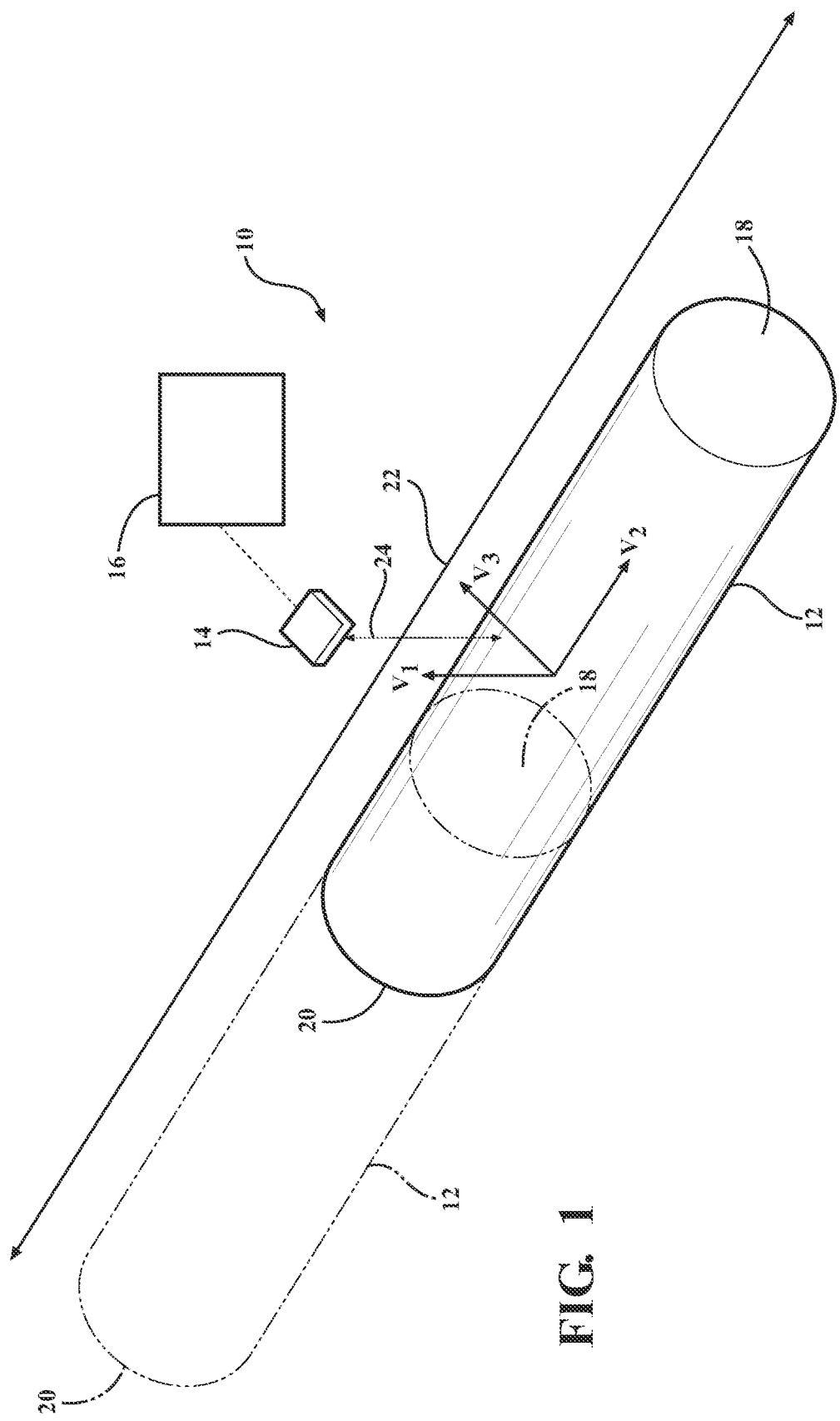
FIG. 1 is a perspective view of one embodiment of a system for determining position of an object using a sensor located a fixed distance from the object and a controller in communication with the sensor.

FIG. 1 illustrates an embodiment of the system 10. The system 10 includes an object 12, a sensor 14, and a controller 16. The object 12 is configured to produce a magnetic field H. The magnetic field H has a first vector component V1, a second vector component V2, and a third vector component V3. The first, second, and third vector components V1, V2, V3 are orthogonal to one another.

The object 12 can have several configurations. In FIG. 1, the object 12 is substantially cylindrical and has a first end 18 and a second end 20. Each of the first, second, and third vector components V1, V2, V3 has both a direction and a magnitude. The direction of the first vector component V1 extends radially from the object 12 in the direction of the sensor 14. The direction of the second vector component V2 extends longitudinally through the object 12 orthogonal to the first vector component V1. The direction of the third vector component V3 extends radially from the object 12 orthogonal to both the first and second vector components V1, V2. The object 12 can be any shape suitable to produce the magnetic field H. The object 12 may have configurations other than those specifically described herein.

Figure 2:
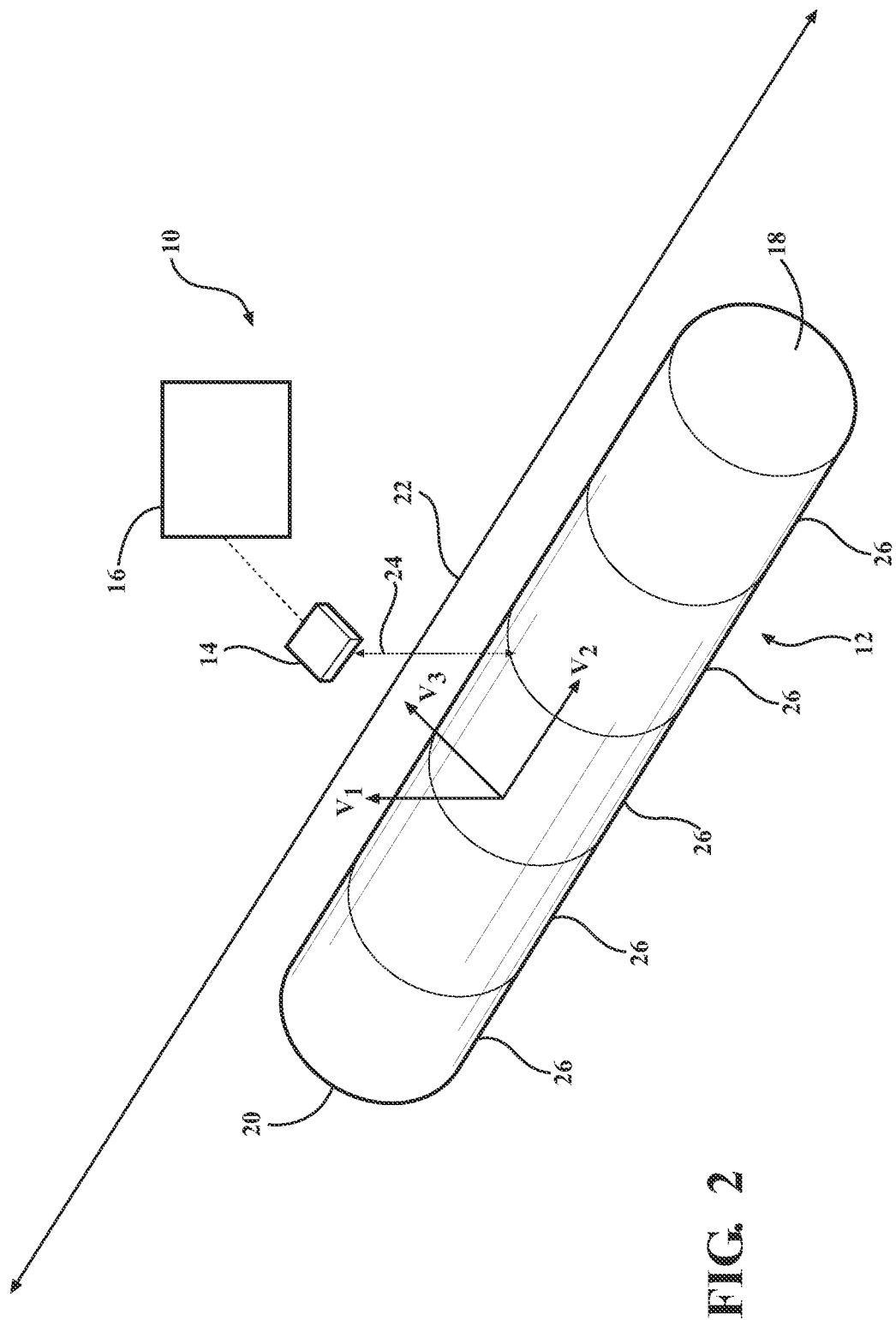
FIG. 2 is a perspective view of another embodiment of the system for determining position, wherein the object includes a plurality of magnets.

In FIG. 1, the object 12 is a single magnet configured to produce the magnetic field H. In FIG. 2, the object 12 includes a plurality of magnets 26 configured to altogether produce the magnetic field H. In some embodiments, the magnets 26 are permanent magnets. In other embodiments, the magnets 26 are electromagnets.

The sensor 14 is a magnetic field sensor configured to measure the magnitudes of each of the first, second, and third vectors components V1, V2, V3 of the magnetic field H when the object 12 is within a range of positions 22. The magnitudes of each of the first, second, and third vector components V1, V2, V3 can be measured in terms of either magnetic flux density or magnetic field intensity. Although the letter 'H' is used herein to refer to the magnetic field H, referring to strength of the magnetic field H expressed in amperes per meter, the magnetic field H can also be expression in terms of the Lorentz force it exerts on moving electric charges, i.e. 'B', or any other suitable method of expressing a field generated by magnetized material.

The range of positions 22 is defined such that as the object 12 is moved within the range of positions 22, the object 12 moves along a single axis such that the sensor 14 is located between the first end 18 and the second end 20 and the sensor 14 remains a fixed distance 24 from the object 12. The object 12 may move along the single axis via a predetermined path. In some embodiments, the range of positions 22 is shorter due to an edge effect of the magnetic field H. The edge effect affects measurement of the magnetic field H such that measuring the magnitudes of the first, second, and third vector components V1, V2, V3 near the first end 18 or the second end 20 of the object 12 is undesirable.

The sensor 14 is configured to measure the magnitude of each of the first, second, and third vector components V1, V2, V3 of the magnetic field H substantially simultaneously. The sensor 14 can be any type of sensor capable of measuring the magnitude of each of the first, second, and third vector components V1, V2, V3 of the magnetic field H, such as, but not limited to, a rotating coil, hall effect, magnetoresistive, fluxgate, superconducting quantum interference device, or spin-exchange relaxation-free atomic magnetometer. The sensor 14 may have configurations other than those specifically described herein.

The controller 16 is in communication with the sensor 14. The controller 16 performs many of the high-accuracy position determination steps of the method 40. The controller 16 receives the magnitudes of the first, second, and third vector components V1, V2, V3 of the magnetic field H from the sensor 14. The controller 16 can be a microcontroller, state machine, field-programmable gate array, CPU, or any other device suitable for receiving and analyzing the magnitudes of the first, second, and third vector components V1, V2, V3 from the sensor 14.

Figure 4:
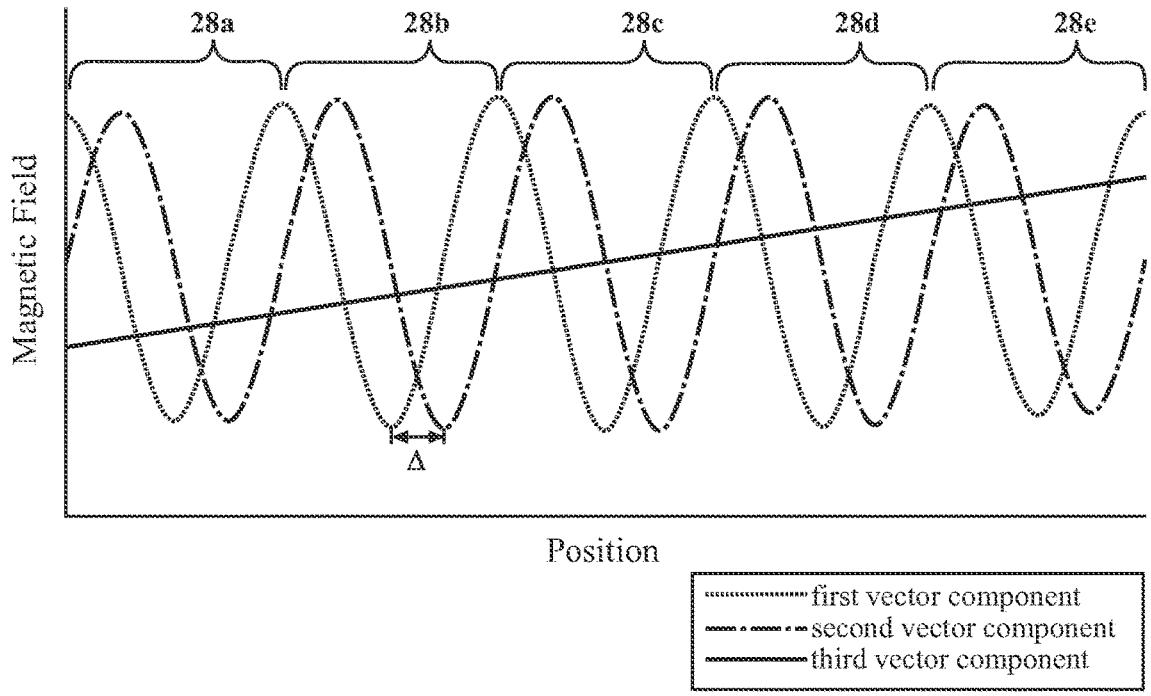
FIG. 4 is a chart illustrating magnitudes of a first, a second, and a third vector component of the object acquired by the sensor according to one example.

With reference to FIG. 4, the object 12 is configured such that the magnitude of the first vector component V1 and the magnitude of the second vector component V2 measured by the sensor 14 as the object 12 is moved across the range of positions 22 are each periodic functions. In one embodiment, the magnitude of the first vector component V1 and the magnitude of the second vector component V2 are each sinusoidal. The magnitudes of the first and second vector components V1, V2 measured at any position within the range of positions 22 have a phase difference Δ. In another embodiment, the magnitude of the first vector component V1 substantially resembles a cosine wave and the magnitude of the second vector component V2 substantially resembles a sine wave.

The object 12 is configured such that the magnitude of the third vector component V3 has a unique value for each possible position of the sensor 14 relative the object 12 as the object 12 is moved across the range of positions 22. In some embodiments, the magnitude of the third vector component V3 is a monotonic function. In one example, the magnitude of the third vector component V3 continually increases as the object 12 is moved across the range of positions 22. In another example, the magnitude of the third vector component V3 continually decreases as the object 12 is moved across the range of positions.

FIG. 4 is a chart illustrating the magnitudes of the first, second, and third vector components V1, V2, V3 of an exemplary embodiment of the invention. The chart has a horizontal position axis and a vertical magnetic field axis. The position axis corresponds to position of the object 12 within the range of positions 22. The left-most value on the position axis corresponds to the object 12 being located within the range of positions 22 such that the sensor 14 is nearest the first end 18 of the object 12. Increasing values of the position axis, i.e. values further toward the right of the position axis, correspond to the object 12 being located such that the sensor 14 is nearer the second end 20 of the object 12. The right-most value on the position axis corresponds to the object 12 being located within the range of positions 22 such that the sensor 14 is nearest the second end 20 of the object 12.

The magnetic field axis corresponds to the magnitudes of the first, second, and third vector components V1, V2, V3 measured by the sensor 14 and communicated to the controller 16 at each position along the horizontal axis. In FIG. 4, the magnitudes of the first and second vector components V1, V2 are sinusoidal and the phase difference Δ is about π/2 radians, i.e. 90 degrees. The magnitudes of the first and second vector components V1, V2 are periodic functions related to the position of the object 12 within the range of positions 22. The magnitude of the third vector component V3 is a monotonic function related to the position of the object 12 within the range of positions 22. In FIG. 4, the magnitude of the third vector component V3 continually increases as the object 12 is moved across the range of positions 22 such that the sensor 14 measures the magnitude of the third vector component V3 from near the first end 18 of the object 12 to near the second end 20 of the object 12.

With continued reference to FIG. 4, position of the object 12 over each period of the magnitudes of each of the first and second vector components V1, V2 defines each cycle of a plurality of cycles 28a, 28b, 28c, 28d, 28e. In the embodiment of the invention illustrated in FIG. 4, the plurality of cycles 28a, 28b, 28c, 28d, 28e includes five cycles. The number of cycles is dependent upon the magnetic field H, and is thereby dependent upon configuration of the object 12. It should be appreciated that the object 12 can be configured in many ways, and the plurality of cycles 28a, 28b, 28c, 28d, 28e can include any amount of cycles.

Figure 3:
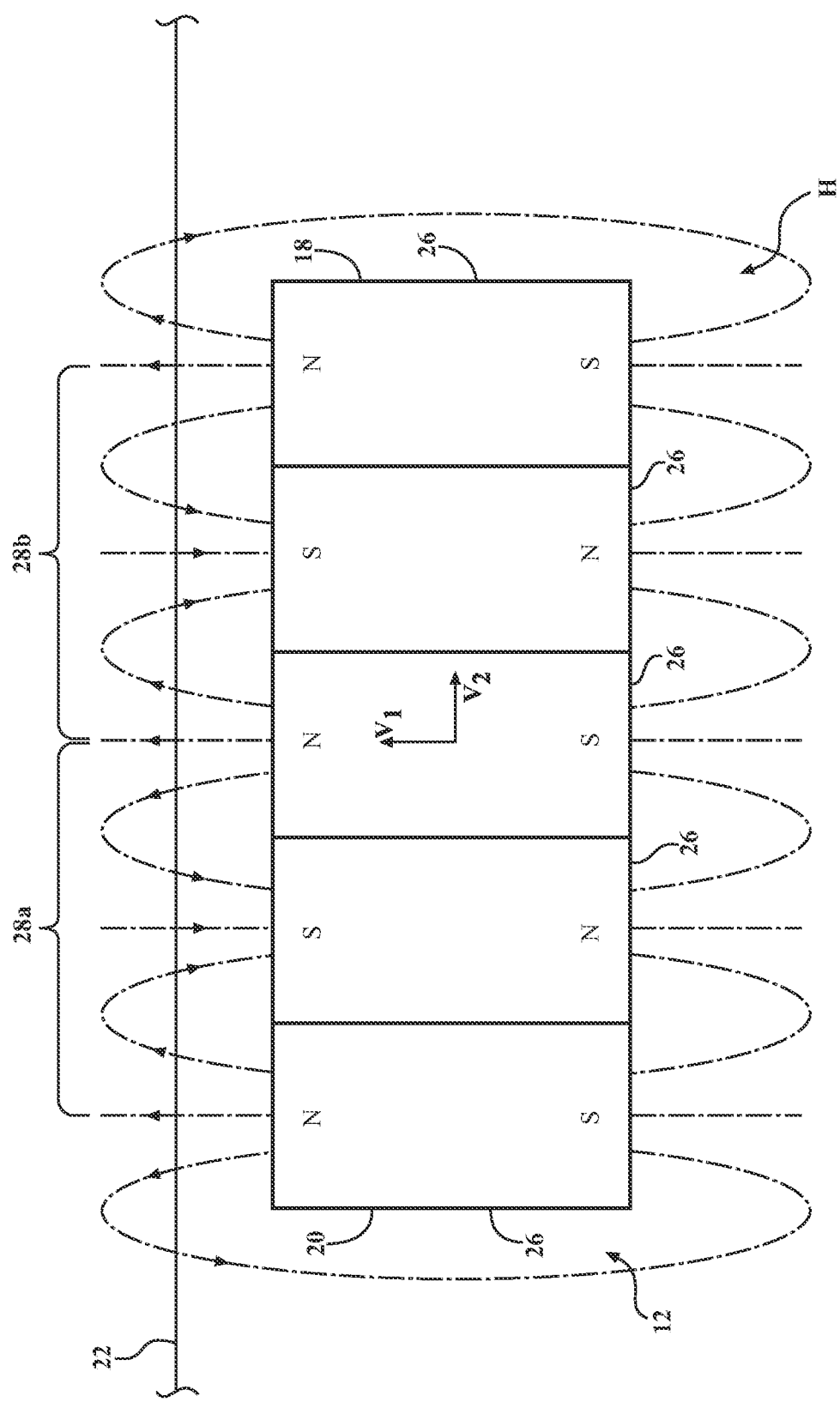
FIG. 3 is a layout of one embodiment of an object for use in positions sensing.

FIG. 3 illustrates one embodiment of the object 12 including the plurality of magnets 26. The number of cycles included in the plurality of cycles 28a, 28b, 28c, 28d, 28e is dependent upon the number of magnetic included in the plurality of magnets 26. In FIG. 3, the plurality of magnets 26 includes five magnets, thereby causing the plurality of cycles 28a, 28b, 28c, 28d, 28e to include two cycles. The edge effect prevents the plurality of cycles 28a, 28b, 28c, 28d, 28e from including more than two cycles, as the sensor 14 in unable to reliably measure the magnetic field H near the first and second ends 18, 20 of the object 12.

With continued reference to FIG. 3, the magnets 26 each have a north pole N and a south pole S. The magnets 26 are oriented such that the north and south poles N, S that are adjacent to one another have opposing polarities, i.e. each of the north poles N is adjacent only to one or more of the south poles S, and each of the south poles S is adjacent only to one or more of the north poles N. The opposing polarities of the north and south poles N, S cause the magnitudes of the first and second vector components V1, V2 to be sinusoidal with respect to position of the object 12 within the range of positions 22 as shown in FIG. 4.

The controller 16 is configured to determine a relative position of the object 12 within an undetermined cycle of the plurality of cycles 28a, 28b, 28c, 28d, 28e based upon the magnitudes of the first and second vector components V1, V2. The relative position of the object 12 is a position of the object 12 determined within an undetermined cycle of the plurality of cycles 28a, 28b, 28c, 28d, 28e. For example, when the plurality of cycles 28a, 28b, 28c, 28d, 28e includes five cycles, the controller 16 determines precisely where the object 12 is located within one cycle of the five cycles, but within which cycle of the five cycles the object 12 is located is undetermined. In other words, although the controller 16 may accurately determine the relative position of the object 12 within any given single cycle, the controller 16 cannot determine which cycle of the plurality is being measured based upon the magnitudes of the first and second vector components V1, V2.

Accordingly, the controller 16 is configured to determine in which cycle of the plurality of cycles 28a, 28b, 28c, 28d, 28e the object 12 is located based on the magnitude of the third vector component V3. The controller 16 determines the cycle in which the object 12 is located by corresponding the magnitude of the third vector component V3 with the cycle in which the object 12 is located. The techniques by which the controller determines the cycle in which the object 12 is located are described in detail below.

Figure 6:
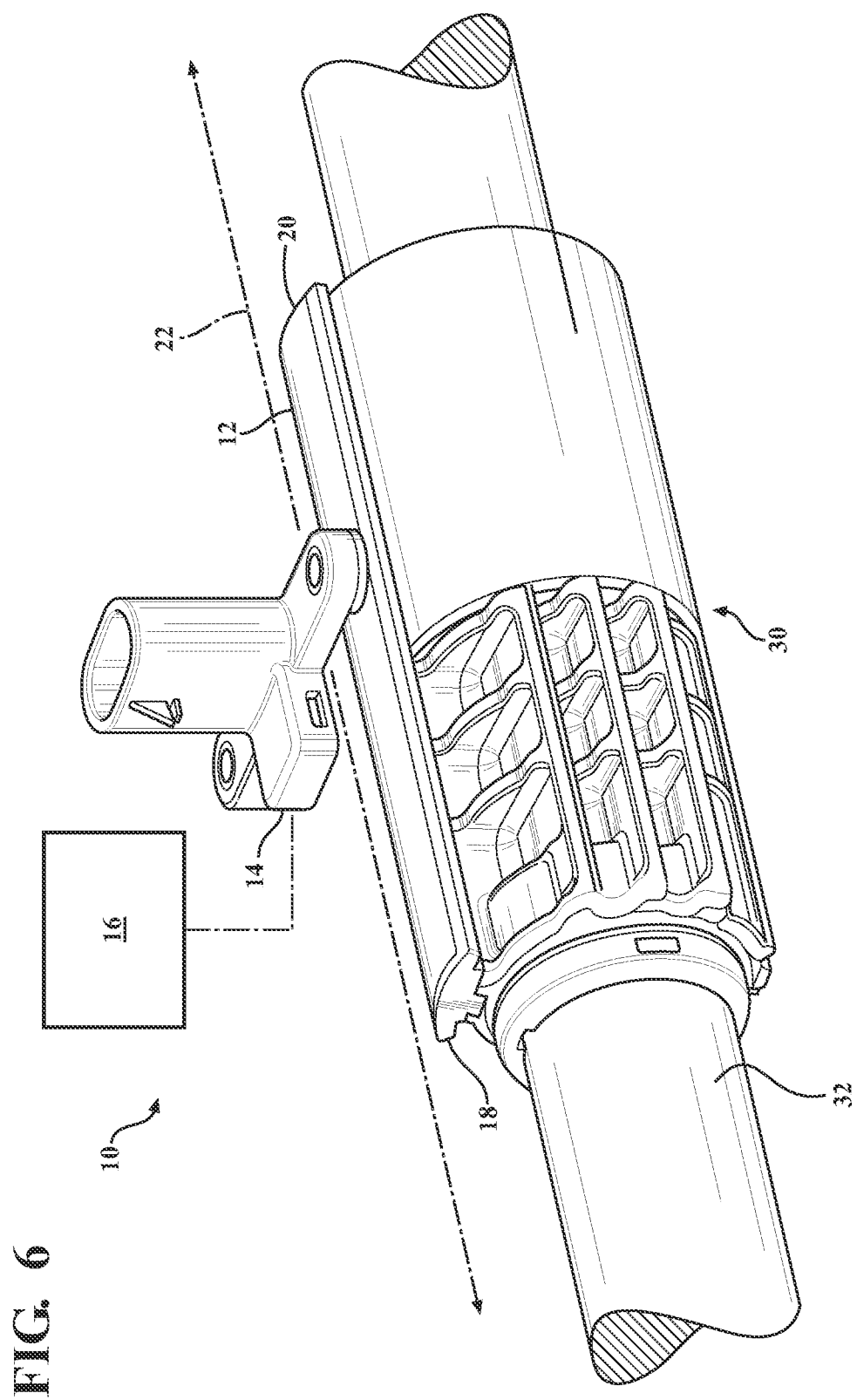
FIG. 6 is a perspective view of yet another embodiment of the system for determining position, wherein the object is fixed to a clutch positioning component of an automated manual transmission.

Referring now to FIG. 6, in some embodiments, a secondary object 30 is fixed to the object 12. The secondary object 30 is fixed to the object 12 such that the secondary object 30 has constant position relative the object 12 as the object 12 is moved within the range of positions 22. For example, in FIG. 6, the secondary object 30 is fixed to the object 12 such that the secondary object 30 is located directly below the object 12. As the object 12 is moved within the range of positions 22, the secondary object 30 will continue to be located directly below the object 12. The secondary object 30 can be fixed to the object 12 and located relative the object 12 in ways other than those specifically described herein. The controller 16 is programmed with location and of the secondary object 30 relative the object 12. As the controller 16 determines location of the object 12, the controller can also determine location of the secondary object 30 based on location of the secondary object 30 relative the object 12.

With continued reference to FIG. 6, an exemplary embodiment including a clutch actuation component 30 for an automobile, commonly a truck, having an automated manual transmission is shown. The automated manual transmission allows an automobile transmission having a manual transmission gearbox to change gears without manual operation of a clutch pedal by a human operator. The automobile transmission changes gears with automated clutch actuation by a transmission control module. The transmission control module is a closed-loop control system. In some embodiments, the controller 16 includes the transmission control module.

The clutch actuation component 30 is fixed to a clutch positioning rod 32. The clutch positioning rod 32 is actuated according to signals from the transmission control module to control position of an automotive clutch during automated shifting operations of the automated manual transmission.

The transmission control module requires high-accuracy knowledge of position of the automotive clutch to facilitate smooth operation of the vehicle during gear shifting. The object 12 is fixed to and extends along a length of the clutch actuation component 30. The object 12 is moved within the range of positions 22 as the clutch positioning rod is actuated. The controller 16 communicates position of the object 12 to the transmission control module. The transmission control module infers position of the automotive clutch by knowledge of fixed distances between the object 12, the clutch actuation component 30, and the automotive clutch.

II. Method Description

Figure 7:
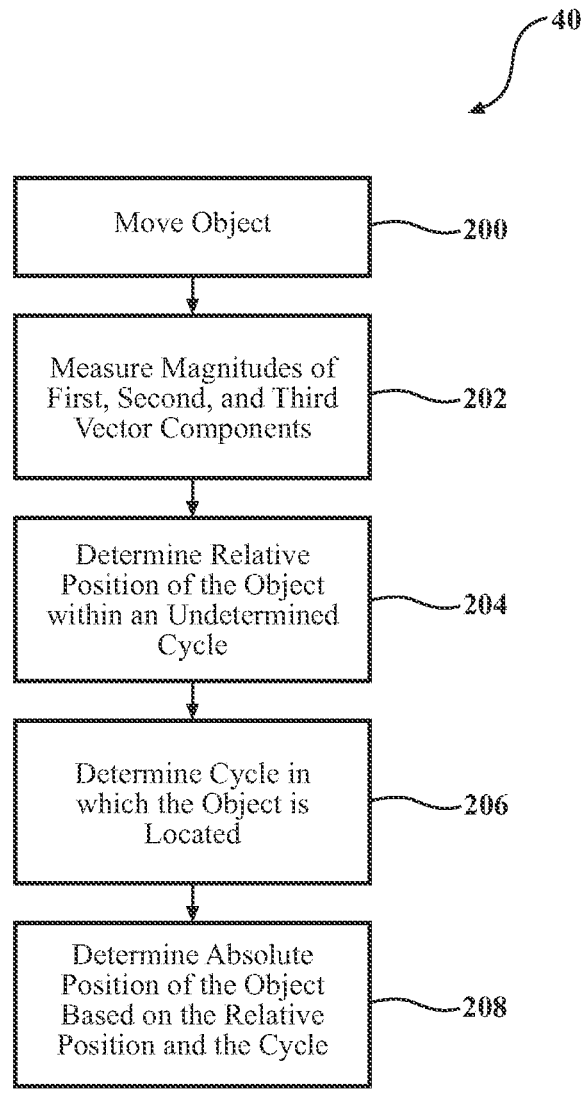
FIG. 7 is a flowchart of an embodiment of a method of determining position.

FIG. 7 is a flowchart illustrating detailed operation of the method 40 for determining high-accuracy position of the object 12. As described, the method 40 occurs while the object 12 is within the range of positions 22.

At step 200, the object 12 is moved to within the range of positions 22. The object 12 can be moved to within the range of positions 22 from a position within the range of positions 22 or can be moved to within the range of positions 22 from a position outside the range of positions 22.

At step 202, the sensor 14 measures a magnitude of each of the first, second, and third vector components V1, V2, V3.

At step 204, the controller 16 determines the relative position of the object 12 within the undetermined cycle of the plurality of cycles 28a, 28b, 28c, 28d, 28e. The relative position is expressed as a position parameter. In one embodiment, the controller 16 does so by determining a position parameter having a tangent equal to a quotient of both the magnitude of the first vector component V1 and the magnitude of the second vector component V2. The position parameter is a value between $-\pi/2$ radians and $\pi/2$ radians, i.e. −90 degrees and 90 degrees.

Figure 5:
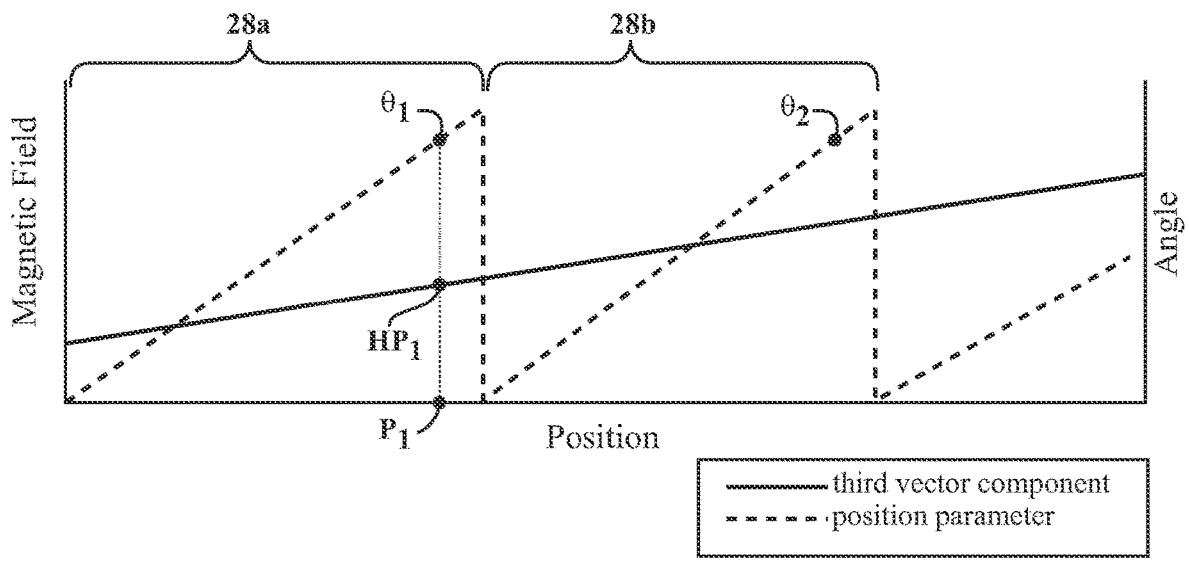
FIG. 5 is a chart illustrating the relationship of the first and second vector components to a relative position of the object and the relationship of the third vector component to a cycle within a plurality of cycles in which the object is located according to one example.

FIG. 5 is a chart having a horizontal position axis, a vertical magnetic field axis, and a vertical angle axis. The position axis corresponds to position of the object 12 within the range of positions 22. The left-most value on the position axis corresponds to the object 12 being located within the range of positions 22 such that the sensor 14 is nearest the first end 18 of the object 12. Increasing values of the position axis, i.e. moving toward the right of the position axis, corresponds to the object 12 being located within the range of positions 22 such that the sensor 14 is nearer the second end 20 of the object 12, wherein the right-most value on the position axis corresponds to the object 12 being located within the range of positions 22 such that the sensor 14 is nearest the second end 20 of the object 12.

The magnetic field axis corresponds to the magnitude of the third vector component V3 measured by the sensor 14 and communicated to the controller 16 at each position along the position axis. In FIG. 5, the magnitude of the third vector component V3 continually increases as the object 12 is moved across the range of positions 22 such that the sensor 14 measures the magnitude of the third vector component V3 from near the first end 18 of the object 12 to near the second end 20 of the object 12.

The angle axis corresponds to the value of the position parameter calculated at step 204 by the controller 16 for each position of the object 12 along the position axis. The value of the position parameter is a periodic function having the same period as the sinusoids of the magnitudes of the first and second vector components V1, V2 due to the position parameter being a function of the magnitudes of the first and second vector components V1, V2. Therefore, each period of the value of the position parameter corresponds to a cycle of the plurality of cycles 28a, 28b, 28c, 28d, 28e. The undetermined cycle of the plurality of cycles 28a, 28b, 28c, 28d, 28e is undetermined due to the position parameter having an identical value $\ominus 1$, $\ominus 2$ within each cycle of the plurality of cycles 28a, 28b, 28c, 28d, 28e. Therefore, determination of the position parameter allows for high-accuracy determination of the relative position of the object 12 within the undetermined cycle of the plurality of cycles 28a, 28b, 28c, 28d, 28e.

In some embodiments, the controller 16 determines the relative position by retrieving the position parameter from a position parameter lookup table. The position parameter lookup table is a section of memory accessible by the controller 16 having recorded values of the position value corresponding to the magnitudes of the first and second vector components V1, V2. In other embodiments, the controller 16 determined the relative position by calculating the position parameter as a function of the magnitudes of the first and second vector components V1, V2. Retrieving the position parameter from the position parameter lookup table is advantageous in situations where the controller 16 has limited processing power. Calculating the position parameter as a function of the magnitudes of the first and second vector components V1, V2 is advantageous in situations where the controller 16 has limited memory.

At step 206, the controller 16 determines the cycle in which the object 12 is located. With continued reference to FIG. 5, the magnitude of the third vector component V3 is unique for each position of the object 12 within the range of positions 22 due to the magnitude of the third vector component V3 being a monotonic function of the position of the object 12 within the range of positions 22. Therefore, each cycle of the plurality of cycles 28a, 28b, 28c, 28d, 28e has a corresponding range of magnitudes of the third vector component V3 that correspond thereto. In FIG. 5, the plurality of cycles 28a, 28b, 28c, 28d, 28e includes 2.5 cycles. The magnitude of the third vector component V3 has a distinct range of magnitudes corresponding to each cycle of the plurality of cycles 28a, 28b, 28c, 28d, 28e. In some embodiments, the controller 16 determines the cycle in which the object 12 is located by retrieving from a cycle lookup table the cycle corresponding to the magnitude of the third vector component V3. In other embodiments, the controller 16 determines the cycle in which the object 12 is located by calculating the cycle in which the object 12 is located as a function of the magnitude of the third vector component V3.

FIG. 5 illustrates an exemplary position P1, a first exemplary position parameter $\ominus 1$, a second exemplary position parameter $\ominus 2$, and an exemplary third vector component HP1. The exemplary position P1 is within a first cycle 28a. The first and second exemplary position parameters $\ominus 1$, $\ominus 2$ are determined when the object 12 is located at the exemplary position P1. The first exemplary position parameter $\ominus 1$ is within the first cycle 28a. The second exemplary position parameter $\ominus 2$ has value equal to the first exemplary position parameter $\ominus 1$ and is within a second cycle 28b. The exemplary third vector component HP1 is the magnitude of the third vector component V3 measured when the object 12 is located at the exemplary position P1.

At step 208, the controller 16 calculates an absolute position of the object 12 based on the relative position and the cycle. The absolute position of the object 12 is a high-accuracy determination of position of the object 12 within the cycle of the plurality of cycles 28a, 28b, 28c, 28d, 28e within which the object 12 is located. The controller 16 determines the absolute position of the object 12 by combining the determination of the relative position of the object 12 at step 204 with the determination of the cycle in which controller 16 determined the object 12 is located at step 206.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. A system comprising:
   an actuation component for use with a transmission, said actuation component having a length extending along an axis;
   a positioning rod fixed to said actuation component;

a single homogeneous magnet comprising a length extending along said axis and being configured to produce a magnetic field having a first vector component extending radially from said single homogenous magnet, a second vector component extending longitudinally through said single homogenous magnet, and a third vector component extending radially from said single homogenous magnet, wherein the first, second, and third vector components are orthogonal to one another, and wherein a magnitude of the first vector component and a magnitude of the second vector component define a plurality of cycles;

wherein said single homogenous magnet is fixed to said actuation component such that said length of said single homogenous magnet extends along said length of said actuation component;

wherein said positioning rod, said actuation component, and said single homogenous magnet are fixed relative to each other to move between a range of positions;

a sensor being configured to measure the magnitude of each of the first and second vector components and a magnitude of the third vector component when the single homogeneous magnet is moved within said range of positions;

a controller connected to said sensor and being configured to determine a relative position of said single homogeneous magnet within an undetermined cycle of the plurality of cycles based on the magnitude of the first vector component and the magnitude of the second vector component, to determine a cycle of the plurality of cycles in which said single homogeneous magnet is located based on the magnitude of the third vector component, and to determine an absolute position of said single homogeneous magnet based on the relative position of said single homogeneous magnet and the cycle in which said single homogeneous magnet is located; and a transmission control module configured to receive said absolute position of said single homogenous magnet to determine a position of said positioning rod for inferring a position of a transmission component.

2. The system of claim 1 wherein the magnitude of the third vector component is unique for each possible position of said single homogeneous magnet within the range of positions.

3. The system of claim 1 wherein said single homogeneous magnet is further configured to produce the magnetic field such that the third vector component has a slope that is substantially constant relative to position of the single homogeneous magnet within the range of positions.

4. The system of claim 3 wherein the slope of the third vector component is further defined as being monotonic.

5. The system of claim 1 wherein said single homogeneous magnet is further configured to move within the range of positions along a predetermined path.

6. The system of claim 5 wherein the magnitude of each of the first, second, and third vector components, as measured by said sensor, are configured to change as the single homogeneous magnet moves within the range of positions along the predetermined path.

7. The system of claim 1 wherein said controller is further configured to determine the relative position of said single homogeneous magnet based solely on the magnitude of the first vector component and the magnitude of the second vector component.

8. The system of claim 1 wherein said controller is further configured to determine the cycle in which said single homogeneous magnet is located based solely on the magnitude of the third vector component.

9. The system of claim 1 wherein said actuation component is further defined as a clutch actuation component of an automated manual transmission.

10. A method of operating a system including an actuation component having a length extending along an axis, a positioning rod fixed to the actuation component, a single homogeneous magnet having a length extending along the axis and fixed to the actuation component such that the length of the single homogenous magnet extends along the length of the actuation component, a sensor, a controller connected to the sensor, and a transmission control module, and with the single homogeneous magnet being configured to move within a range of positions and to provide a magnetic field having a first vector component extending radially from the magnet, a second vector component extending longitudinally through the magnet, and a third vector component extending radially from the magnet, wherein the first, second, and third vector components are orthogonal to one another, and wherein a magnitude of the first vector component and a magnitude of the second vector component define a plurality of cycles, said method comprising the steps of:

moving the fixed positioning rod, the actuation component, and single homogenous magnet between a range of positions;

measuring with the sensor the magnitude of each of the first and second vector components and a magnitude of the third vector component when the single homogeneous magnet is moved within the range of positions;

determining with the controller a relative position of the single homogeneous magnet within an undetermined cycle of the plurality of cycles based on the magnitude of the first vector component and the magnitude of the second vector component;

determining with the controller a cycle of the plurality of cycles in which the single homogeneous magnet is located based on the magnitude of the third vector component;

determining with the controller an absolute position of the single homogeneous magnet based on the relative position of the single homogeneous magnet and the cycle in which the single homogeneous magnet is located;

receiving with the transmission control module the absolute position of the single homogenous magnet; and determining with the transmission control module a position of the positioning rod based on the absolute position of the single homogenous magnet.

11. The method of claim 10 wherein the step of determining with the controller the cycle in which the single homogeneous magnet is located is further defined as retrieving with the controller from a lookup table the cycle corresponding to the magnitude of the third vector component.

12. The method of claim 10 wherein the step of determining with the controller the cycle in which the single homogeneous magnet is located is further defined as calculating with the controller the cycle as a function of the magnitude of the third vector component.

13. The method of claim 10 wherein the step of determining with the controller the relative position of the single homogeneous magnet is further defined as retrieving with the controller from a lookup table a position parameter having a tangent equal to a quotient of both the magnitude of the first vector component and the magnitude of the second vector component.

14. The method of claim 10 wherein the step of determining with the controller the relative position of the single homogeneous magnet is further defined as calculating with the controller a position parameter having a tangent equal to a quotient of both the magnitude of the first vector component and the magnitude of the second vector component.

15. A system comprising:
   an actuation component for use with a transmission, said actuation component having a length extending along an axis;
   a positioning rod fixed to said actuation component; and
   a single homogenous magnet comprising a length extending along the axis and being configured to produce a magnetic field having a first vector component extending radially from said single homogenous magnet, a second vector component extending longitudinally through said single homogenous magnet, and a third vector component extending radially from said single homogenous magnet, wherein the first, second, and third vector components are orthogonal to one another, wherein a magnitude of the first vector component and a magnitude of the second vector component each varies cyclically along said length of said single homogeneous magnet, and wherein a magnitude of the third vector component is monotonic along said length of said single homogeneous magnet;
   wherein said single homogenous magnet is fixed to said actuation component such that said length of said single homogeneous magnet extends along said length of said actuation component; and
   wherein said positioning rod, said actuation component, and said single homogenous magnet are fixed relative to each other to move between a range of positions.

16. The system of claim 15, wherein the magnitude of the third vector component is monotonic such that the magnitude of the third vector component is unique for each position along the length of said single homogeneous magnet.

17. The system of claim 15, wherein the magnitude of the first vector component and the magnitude of the second vector component each vary cyclically along the length of said single homogeneous magnet such that a relative position of said single homogeneous magnet is determinable within an undetermined cycle of a plurality of cycles based on the magnitude of the first vector component and the magnitude of the second vector component.

18. The system of claim 17, wherein the magnitude of the third vector component is monotonic along the length of said single homogeneous magnet such that a cycle of the plurality of cycles in which said single homogeneous magnet is located is determinable based on the magnitude of the third vector component.

19. The system of claim 15, wherein:
   the first vector component extends radially from said single homogeneous magnet;
   the second vector component extends longitudinally through said single homogeneous magnet; and
   the third vector component extends radially from said single homogeneous magnet and orthogonal to both the first and second vector components.

20. The system of claim 15 wherein said actuation component is further defined as a clutch actuation component of an automated manual transmission.

* * * * *